Dec. 22, 1942.    L. HORVÁTH ET AL    2,305,784
DEVICE FOR TREATING THE HUMAN MASTICATING APPARATUS
Filed March 2, 1940    2 Sheets-Sheet 1
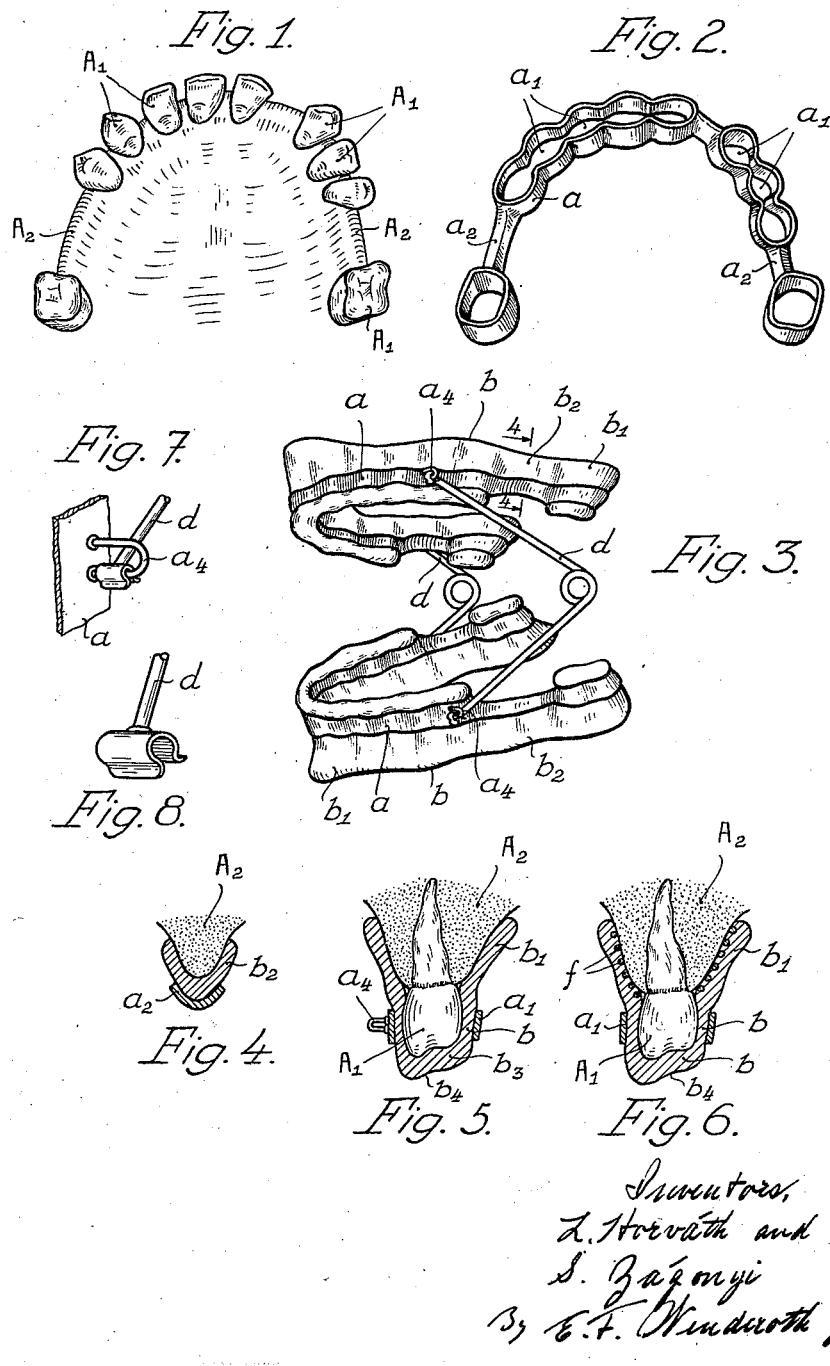

Dec. 22, 1942.   L. HORVÁTH ET AL   2,305,784
DEVICE FOR TREATING THE HUMAN MASTICATING APPARATUS
Filed March 2, 1940   2 Sheets-Sheet 2
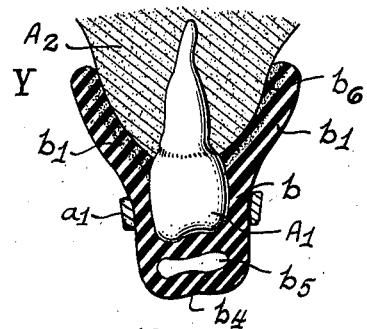
Fig. 9.
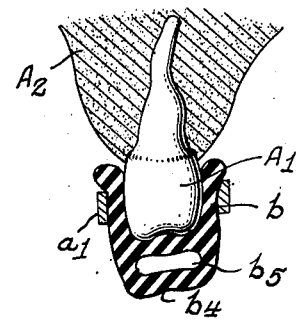
Fig. 10.
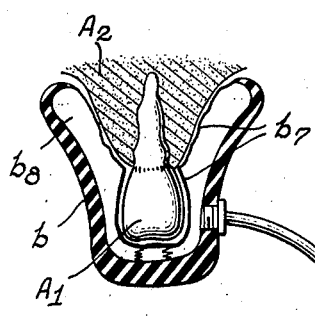
Fig. 11.
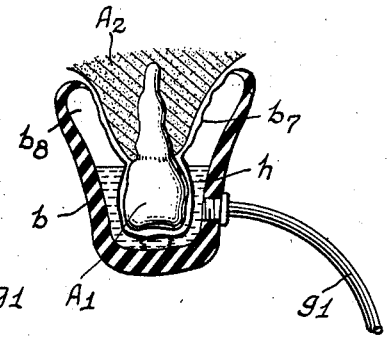
Fig. 12.
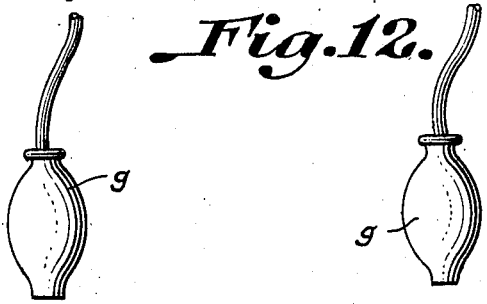
Inventors
L. Horváth
S. Zagonyi
By C. F. Wenderoth Atty.

Patented Dec. 22, 1942

2,305,784

UNITED STATES PATENT OFFICE 2,305,784

DEVICE FOR TREATING THE HUMAN MASTICATING APPARATUS

Lajos Horváth and Samuel Zágonyi, Budapest, Hungary; vested in the Alien Property Custodian Application March 2, 1940, Serial No. 322,036
In Hungary December 21, 1939

5 Claims. (Cl. 32—1)

The human masticating apparatus, i. e. the set of teeth and the gums, according to scientific observations present a striking degeneration particularly in regard to their capacity of resistance, as compared with the masticating apparatus of primeval man, and in fact signs of the gradual decay of these organs are also noticeable, evidence for this fact being furnished by the strikingly high proportion of persons afflicted with bad teeth, destitute of teeth or suffering from decay of gums or paradentosis.

The invention is based on the recognition of the fact that the phenomena, referred to above in general, can, among other causes, chiefly be attributed to the cause that with the evolution of the methods of preparation of food and owing to the many-sided nature of the use of the various table utensils, the human masticating apparatus is now no longer compelled to work with that constant increased output of work as had to be employed in those times when primeval man fed on roots and on the flesh of animals by consuming them in a raw condition.

One of the objects of the invention consists in providing a device enabling the said human masticating apparatus to carry out systematic gymnastic exercises and thereby to be brought, at least approximately, up to the output of work required for the development or maintenance or even restoration in good condition of the teeth and the gums and which will thus assure also the beauty of the teeth.

Another object of the invention consists in providing a device enabling, with or without the above mentioned gymnastic exercises, both gums or at least one of them to be subjected to a massage effect without the usual co-operating massaging work of our hand or fingers, the said massage effect extending automatically and simultaneously to both sides and also to the whole area or at least to a largely extended portion of one or both of the two gums.

The invention consists in a device for treating the human masticating apparatus and the invention is characterized by the fact that it comprises at least one duct constructed so as to follow the outlines of one of the two rows of teeth and/or one of the two gums and surround them from inside and outside, the said duct being provided with means enabling the teeth and/or gums to be subjected to a scrubbing and massaging effect simultaneously from both sides.

The invention, together with its other features and advantageous effects, will be explained in greater detail with reference to the embodiments shown diagrammatically and by way of example on the accompanying drawings.

Fig. 1 is a plan view of the masticating apparatus which is to be exercised with the aid of the device according to the invention.

Fig. 2 is a view in perspective of the frame of the device according to the invention.

Fig. 3 is a perspective view of the complete device.

Fig. 4 shows a section taken along line 4—4 of Fig. 3.

Figs. 5 and 6 are representing, on a greater scale, the section of the duct employed in the device according to the invention as well as of the corresponding tooth and gum.

Figs. 7 and 8 show in details, drawn to a larger scale, one method of inserting springs between two ducts as shown in Fig. 1.

Fig. 9 is a cross-sectional view of a modified construction.

Fig. 10 is a cross-sectional view of a further modification.

Fig. 11 is a similar cross-sectional view of a still further modification, and

Fig. 12 is a cross-sectional view of an additional modification.

Fig. 1 represents a masticating apparatus in which certain teeth are wanting. $A_1$ indicates the teeth, and $A_2$ indicates the gums at the places destitute of teeth. Of this tooth system, including the places destitute of teeth, an exact impression is taken in the manner usual in dental surgery, and the duct according to the invention has to be constructed by means of said impression so as to exactly suit the impression or the models produced by means of said impression, the steps and procedure for preparing such reproductions being well known to those skilled in the art of dental surgery.

Accordingly, the said duct will follow exactly the complete outlines of the masticating apparatus, i. e. of the teeth and of the gums, as shown in Figs. 2 and 3 and will be suitable for surrounding the said masticating apparatus on both sides, i. e. on the inside and on the outside.

The device according to the invention comprises usually although not necessarily two ducts and we prefer to build up said ducts of a metal frame $a$, Fig 2, and of a resiliently yielding sheath $b$ (Figs. 3 to 6). The places $a_1$ of the frame $a$ correspond to the teeth $A_1$, whilst its places $a_2$ correspond to the gums $A_2$ at the places destitute of teeth. As appears from Fig. 2, the frame $a$ forms a consistent body and may really be considered as constituting a series of such tooth crowns as do not project with partition walls into the gaps between the individual teeth and are not interrupted in these places, and which further are continued in the places destitute of teeth by parts $a_2$ which in cross-section, Fig. 4, are of trough shape. The crowns $a_1$ and the rough shaped parts $a_2$, respectively, fit on the original masticating apparatus with such looseness, i. e. leaving such a clearance, as to enable the sheath $b$ to be put into said clearance. This sheath $b$ is likewise made in accordance with said models constructed to suit the exact impression mentioned above, but in such a manner that its cavity should adapt itself somewhat more closely to the teeth $A_1$ and to the gums $A_2$, respectively, but should be able to be drawn on the said teeth or gums in the manner illustrated in Figs. 5 and 6, respectively.

In the embodiment shown the sheath $b$ comprises bottom $b_3$ the outer surface of which is fashioned to constitute a masticating surface $b_4$. The bottom $b_3$ is in the same way as the sheath $b$ itself made of resiliently yielding material, preferably of soft vulcanised rubber, but is of greater thickness than the lateral walls of said sheath $b$ and is, therefore, capable of carrying greater stresses than said sheath $b$ itself, whereas the frame $a$ is made of a material of greater hardness, e. g. of metal, although hard rubber, Bakelite or like artificial resinous materials may be also used.

As appears from Figs. 5 and 6, the sheath $b$ comprises wings $b_1$ which extend so as to cover the gum $a_2$ at least partly and the said wings $b_1$ fit closely but resiliently to the gums $A_2$ from both sides. Further, the sheath $b$ also extends to the rough-shaped bridge $a_2$ corresponding to the places $A_2$ destitute of teeth, in which places the sheath $b$ forms a part $b_2$, likewise trough shaped, the lateral walls of which also fit closely but resiliently to the gum $A_2$ and surround it as clearly shown in Fig. 4.

We prefer to provide in the manner described two ducts $a$, $b$ and to insert a spring arrangement $d$, Fig. 3, between said two ducts. The said spring arrangement urges the two ducts apart. The said two ducts are placed on the lower and upper part of the masticating apparatus, respectively, and then the said spring arrangement $d$ will constantly influence the usual masticating motion because the force of said spring arrangement $d$ has to be overcome in each case if and when, through said masticating motion, the two ducts $a$, $b$ are brought toward each other.

The spring arrangement inserted between the two ducts $a$, $b$ may consist as shown by way of example on the drawing of a wire spring $d$ bent to V or U shape and joined pivotally to lugs $a_4$ fixed to or integral with the frame $a$, as illustrated in greater detail on Figs. 7 and 8. Of course, all parts and all places of junction are rounded off to an extent sufficient to exclude the possibility of lesions.

We prefer the spring system inserted between the two ducts $a$, $b$ to be attached exchangeable as appears clearly from Figs. 7 and 8 and to supply each device with a set consisting of a number of springs of different strengths but otherwise mutually interchangeable. This will enable the masticating apparatus—the capacity of resistance of which becomes reinforced in the course of the gymnastic exercises repeated daily systematically—to be exercised by means of gradually stronger and stronger springs.

In practical use, the two ducts $a$, $b$ are placed into the person's mouth and onto its tooth system or gums, through compressing by hand the spring $d$ whereupon gymnastic exercises may be carried out by the repeated performance of the usual masticating motion. In the course of said repeated masticating motion the whole of both ducts $a$, $b$ will become displaced in the longitudinal direction of the teeth and the rubber sheath $b$ thereof will thus exert a scrubbing effect simultaneously on all of the teeth and a massaging effect on the entire area of both gums. The said scrubbing or massaging effect will result in the effective cleaning of all teeth from all sides and/or in the massage of the totality of the gums without the person performing the exercise having to use his hand or fingers for said purpose, as the effects mentioned are produced exclusively by the repeated performance of masticating motion. This is a very important advantage as compared with the well-known tooth cleaning and gum-massaging devices to be operated by hand, the effect of which extends only to single points or exceedingly limited regions.

Daily systematic exercises of masticating motion by means of said device have proved to be suitable for gradually strengthening the masticating apparatus, similarly to what is the case with gymnastic exercises as usually employed in the case of other organs of the human body and, moreover, they have also proved to be effective in preventing diseases of the masticating apparatus. Aside from this, the said masticating motion will, owing to the apparatus according to the invention, make demands on, or set in motion also all muscles, veins and nerves of the face connected with or being in the vicinity of the masticating apparatus and will, similarly to what is the case with other kinds of gymnastic exercises, promote their development and maintenance in good condition. Accordingly, the said gymnastic exercise represents an internal treatment of the whole face, which by putting blood circulation in order, viz. increasing it, will also have a favourable effect on the elasticity and therefore on the freshness of the face and will thus become an important factor in facial cosmetics too.

Fig. 8 shows that electrical conductors $f$ enabling the introduction of electric current may be embedded into both or only one of the extensions or wings $b_1$ of the rubber sheath $b$. This will enable an electric treatment to be performed, e. g. if an electric current interrupted with high frequencies is used, the said electric treatment will result in an electric vibrational massage of one or both of the gums and, in addition thereto, the whole of the face will be also subjected to said electrical vibrational massage from the inside. In this case the apparatus has to be equipped with means for connection to a source of electric current, for instance a pocket battery, and, if necessary, with a current regulator.

We have found that the systematic use of the exercising apparatus according to the invention, particularly in combination with an electric vibratory treatment as set out above, has an advantageous effect on the muscles and nerves of the visual, acoustic and olfactory organs too, as well as on those of the throat and of the larynx, which fact is probably due to its effect of strengthening the muscles and nerves of the whole face.

The invention may also be carried into effect in many ways different from the embodiments illustrated merely by way of example.

Thus, for instance, the two ducts may be constructed without the encasing or frame $a$ in which case each duct will be constituted by a resiliently yielding body $b$ only.

Further, in case the mouth is completely destitute of teeth, the duct or ducts have to be made along their whole length with a trough-shaped cross-section $b_2$ only, as shown in Fig. 4, in which case the use of the device will result in the increase of the capacity of resistance of the gums, and will thus render them more suitable for supporting a set of false teeth.

Further, it is not absolutely necessary to provide on the ducts extensions $b_1$ covering the gums $A_2$ on both sides because, in practice, intermediate cases may occur in which massaging of the gums is not necessary or even not desirable or massaging of the gums should take place on one side only.

The spring system inserted between the two ducts may be of any design desired and the spring wire $d$ according to Fig. 3 may be replaced by a plate spring or by a helical spring, and it is also possible to insert between the two ducts an air cushion $b_5$, Figs. 9 and 10, a hollow or solid rubber body or the like in order to get or increase the springy effect desired. During the masticating motion of the jaws the duct, embracing the teeth $A_1$ and gums $A_2$ from both sides, performs, as a whole, an up and down movement indicated in Fig. 9 by arrow X and, simultaneously, the resilient wings $b_1$, exerting constantly an elastic pressure against both sides of the gum, perform a free sidewise tilting and oscillating movement, as indicated in Fig. 9 by arrow Y, in view of the fact that the rigid parts or the rigid holding means $a_1$ of said duct do not extend but within the region of the teeth $A_1$. The embodiment according to Fig. 10 is intended for treating the teeth only, no wings $b_1$ being provided for massaging the gums $A_2$.

The sheath $b$ may be made if desired of a material which, as for instance rubber of sponge-like structure, is capable of imbibing liquids in which case the sheath $b$ may be saturated, before performing the gymnastic exercise, with a liquid possessing curative effects as shown by way of example at $b_6$ and Fig. 9 in the form of a sheet integral with said wings $b_1$.

Similarly, the rubber sheath $b$ may be constructed in a manner that the said sheath as a whole or at least its gum covering extensions or wings $b_1$, $b_2$ should form a closed cushion $b_8$, Figs. 10 and 11 capable of being filled with air or fluid $h$, Fig. 11, in which case, if air is insufflated into them periodically by means of a suitable device, for instance by a bulb $g$ and tube $g_1$, the inner flexible wall $b_7$ of the air cushion will become inflated and will be pressed repeatedly against the gums which will result in an effective sort of massage. A similar but harder massaging effect may be achieved by using as an inflating means a fluid $h$, Fig. 12, instead of air. In case the bottom $b_3$ of the sheath $b$ is constructed as an inflatable air cushion $b_5$ or $b_8$, it may at the same time also bring about or increase the springy effect desired between the two ducts.

Furthermore, each duct or at least one of them may be composed of several sections, each section extending but to one part, for instance one half or one third, of the upper or lower row of the teeth so that it is only the assembly of said sections which will extend to the whole area of the row of teeth or gum. Aside of this, there may occur practical cases in which but one duct is necessary for massaging purposes only, the said massaging being performed by inflating periodically air cushions or by electrical vibrations as set out above, or by using for said gymnastic exercises one duct only.

What we claim is:

1. A device for treating the teeth, gums and facial muscles comprising a support following the outlines of the upper teeth, a second support following the outlines of the lower teeth, a sheath carried by each of said supports, wings on said sheaths embracing the gums and an air cushion provided in each of said sheaths.

2. A device for treating the teeth, gums and facial muscles comprising a support following the outlines of the upper teeth, a second support following the outlines of the lower teeth, a sheath carried by each of said supports, wings on said sheaths embracing the gums and an air cushion provided in each of said sheaths located adjacent the contacting surfaces of said sheaths upon closure of the teeth.

3. A device for treating the teeth, gums and facial muscles comprising a support following the outlines of the upper teeth, a second support following the outlines of the lower teeth, a sheath carried by each of said supports, wings on said sheaths embracing the gums, said wings and sheaths having a hollow construction and means for inflating said wings and sheaths.

4. A device for treating the teeth, gums and facial muscles comprising a support adapted to follow the outlines of the teeth, a sheath carried by said support adapted to ensheath the teeth, wings on said sheath embracing the gums and an air cushion provided in said sheath adjacent to and generally parallel with the occlusal surface of the teeth.

5. A device for treating the teeth, gums and facial muscles comprising a support adapted to follow the outlines of the teeth, a sheath carried by said support adapted to ensheath the teeth, wings on said sheath embracing the gums, said wings and sheath being of a hollow construction and means for inflating said wings and sheath.

LAJOS HORVÁTH.
SAMUEL ZÁGONYI.